Figure 1:
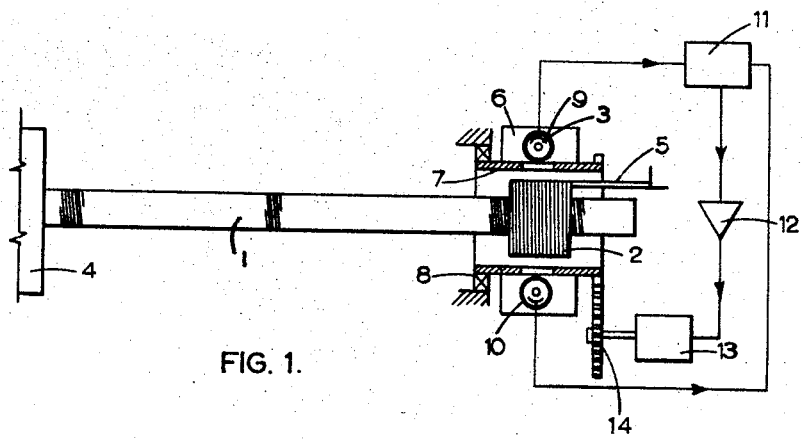

Nov. 25, 1958  R. E. SPENCER  2,861,345
DISPLACEMENT MEASURING DEVICES
Filed Sept. 7, 1955

*Inventor*
*R. E. Spencer*

United States Patent Office 2,861,345
Patented Nov. 25, 1958

2,861,345

DISPLACEMENT MEASURING DEVICES

Rolf Edmund Spencer, West Ealing, London, England, assignor to Electric & Musical Industries Limited, Hayes, England, a British company Application September 7, 1955, Serial No. 532,954

Claims priority, application Great Britain September 11, 1954

6 Claims. (Cl. 33—125)

This invention relates to displacement measuring devices.

Proposals have recently been made for using optical gratings to give precise measurement of displacement, for example, for use in controlling machine tools. According to these proposals two transparent gratings are employed, having prismatic rulings on their surfaces extending substantially perpendicularly to the length of the gratings. The gratings are mounted one over the other with the rulings at a slight angle to each other, and when the light is projected through the gratings, so-called moiré fringes are produced extending parallel to the length of the gratings. These fringes are relatively widely spaced and can be observed by photo-electric cells having rational apertures. Moreover, if one grating is displaced relative to the other in the direction of the length of the gratings the moiré fringes moved at right angles to the displacement at a greatly magnified rate. By counting the fringes with the aid of the photo-cell the displacement can thus be measured and since the fringes are produced by integration over many "lines" of grating high accuracy is obtainable. In prior proposals, two photo-electric cells are in fact used, spaced 90° in phase on the moiré fringe pattern, the two cells being required to determine the direction of passage of the fringes, and hence the sense of the displacement.

Such prior proposals have the disadvantage that position can only be determined by means of a count from some established datum, and counters are in general complex and are not infallible. The object of the present invention is to reduce this disadvantage.

According to the invention there is provided a displacement measuring device comprising co-operating optical gratings one of which is responsive to a primary displacement to be measured and which are arranged to produce a repeating light pattern which on displacement of said first grating undergoes a coersponding but magnified displacement relative to another grating, an observing device, tracking means responsive to said observing device for producing relative displacement between said observing device and said other grating to maintain a substantially fixed relationship between said light pattern and said observing device and thereby to obtain a magnified measure of the primary displacement.

Figure 2:
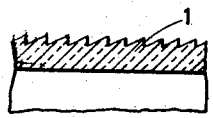
Figure 3:
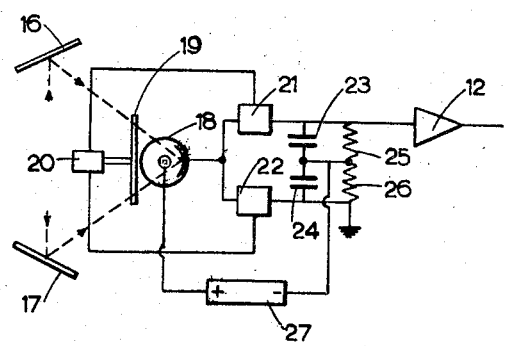

In order that the invention may be clearly understood and readily carried into effect, the invention will be described with reference to the accompanying drawings, in which:

Figure 1 illustrates diagrammatically and partly in block form one example of a preferred form of measuring device according to the present invention, Figure 2 is a cross-sectional view, on an enlarged scale of a fragment of one grating used in the device of Figure 1, and Figure 3 illustrates a modified form of a tracking means which may be used in Figure 1.

Referring to Figure 1, the device comprises a transmission grating in the form of a long cylinder carrying a helical prismatic formation with a pitch of, say, 0.010". The outline of the prismatic formation may be, for example, of the form shown in Figure 2, and the effect is that of a series of closely spaced rulings on the grating 1, with a spacing of 0.010 inch. The grating 1 projects through and slides in another but shorter cylindrical grating 2 co-axial with the grating 1. The grating 2 is fromed with rulings similar to and having the same spacing as those on the grating 1 but inclined slightly relative thereto, the inclination being achieved by circular formations on the grating 2. In some cases however it may be more convenient to achieve the relative inclination by helical formations on both the gratings, but having say two starts on the grating 1 and a pitch of 0.020 inch and only one start on the grating 2 with a pitch of 0.010 inch. When suitably illuminated the two gratings 1 and 2 co-operate in the manner indicated above to produce a single cycle moiré fringe pattern round the circumference of the grating 2, a single cycle pattern giving maximum sensitivity. The fringe in the pattern extends of course parallel to the axis of the gratings 1 and 2. The grating 1 is connected to a member whose displacement is to be measured so as to move in either direction of the axis in response to the displacement. The member may consist of the worktable or tool head of a machine tool and is represented diagrammatically in the drawing by the reference 4, and the displacement to be measured is referred to herein and in the claims as primary displacement. The outer grating 2 is fixed rigidly to a suitable base represented by the reference 5.

An observing device 6 is mounted on a sleeve 7 rotatable on bearings 8 about the axis of the gratings 1 and 2 and the observing device carries two photo-electric cells 9 and 10 which are diametrically opposite each other with reference to the grating axis. The cells are thus arranged to observe the light pattern produced by the gratings at positions spaced 180° apart on the light pattern. The electrical signal outputs of the cells 9 and 10 are applied to a comparison circuit 11 which sets up an output having a magnitude and polarity representing the difference between the applied inputs. The output of the circuit 11 is amplified in amplifier 12 and applied to a servo-motor 13 arranged to rotate the sleeve 7 through the intermediary of the gear 14 which engages teeth formed round the sleeve 7. In operation therefore, the servo-motor 13 rotates the sleeve in such manner as to reduce differences between the electrical outputs of the photo-electric cells 9 and 10, so that any movement of the light pattern in response to primary displacement of the grating 1 produces a corresponding and magnified displacement of the observing device 6 about the axis of the gratings 1 and 2, which can be used as a measure of the primary displacement. Thus, a potentiometer may be coupled to the sleeve 7 in any suitable manner to set up a potential analogue to the angular displacement of the observing device.

If the gratings are both transmission gratings as described, the lighting for the gratings is located inside the cylinders, but if the inner grating 1 is of the reflecting type the lighting may be outside the gratings.

In the formation of the light pattern, integration over many lines of the gratings is involved so that it is possible, by the arrangement described, to locate the observing device 6 to a small fraction of a fringe width. Assuming that the observing device can be set by the servo-motor 13 to within one hundredth of a fringe width, the primary disrlacement can then be measured to an accuracy of 0.0001 inch, since the light pattern repeats itself for each primary displacement of 0.010 inch. The position of the observing device 6 will of course also repeat itself after 0.010 inch of movement but the number of cycles of movement effected by the device 6 can be determined readily in a variety of ways, for example by means of a leadscrew, since a leadscrew can be used to detect positions to an accuracy of 0.005 inch. Furthermore, since the moiré fringe lies parallel to the common axis of the gratings 1 and 2 any end play in the pivot of the observing device is not significant.

The prismatic formations on the gratings 1 and 2 can be formed in any suitable manner and "black and white" line type of gratings can be used instead of the prismatic gratings if desired. In the specification and claims the expression "rulings" is used in a general sense to denote the elements of the gratings, and is not to be taken as restricting the invention to gratings in which the deflecting elements are formed by an actual ruling operation.

In the modified form of tracking means shown in Figure 3 a single photo-electric cell is used instead of the two cells 9 and 10 of Figure 1. The observing device comprising mirrors 16 and 17 which reflect light from two points on the light pattern spaced 180° in phase, the light being directed to the single photo-electric cell 18. The admission of light from the two mirrors to the cell 18 is however, controlled by a rotatable shutter 19 driven by a small electric motor 20, the shutter being arranged to admit light from the two mirrors alternately to the photo-electric cell for equal time intervals. The electrical signal output of the photo-electric cell is applied to two gates 21 and 22 which are opened alternately under the control of synchronising signals derived from the motor 20. Thus the gate 21 is open when the shutter 19 admits light from the mirror 16 and the gate 22 is open when the shutter 19 admits light from the mirror 17. The gates lead to the opposite input terminals of the comparison circuit 11 which as shown in Figure 3 may comprise two storage capacitors 23 and 24 shunted by resistors 25 and 26, the junction of 23 and 24 being connected to the junction of 25 and 26 and also to the negative terminal of a polarising source 27 for the cell 18. One end of the resistor 26 is grounded and the output of the comparison circuit is taken from one end of the resistor 25 and forms the signal applied to the amplifier 12. The parts 16 to 20 of Figure 3 form the observing device of the tracking means and are mounted for rotation about the axis of the gratings as in the case of the observing device 6 of Figure 1. The commutation of the light from two points in the light pattern to the cell 18 can be achieved otherwise than by means of a rotating cutter, for example, by means of oscillating mirrors or prisms. The employment of only a single electric cell 18 in the observing device avoids errors due to drifts of the sensitivities of different photo-electric cells.

What I claim is:

1. A displacement measuring device comprising cooperating optical gratings one of which is responsive to a primary displacement to be measured and which are arranged to produce a repeating light pattern which on displacement of said first grating undergoes a corresponding but magnified displacement relative to the other grating, an observing device, tracking means responsive to said observing device for producing relative displacement between said observing device and said other grating to maintain a substantially fixed relationship between said light pattern and said observing device and thereby to obtain a magnified measure of the primary displacement.

2. A displacement measuring device comprising cooperating optical gratings one of which is displaceable in a predetermined direction in response to a primary displacement to be measured and which have mutually inclined rulings transverse to said predetermined direction to produce a repeating light pattern having at least one fringe extending parallel to said predetermined direction and which on displacement of said first grating undergoes a corresponding but magnified displacement relative to the other grating in a direction transverse to said predetermined direction, an observing device, and tracking means responsive to said observing device for producing relative angular displacement between said observing device and one of said gratings about an axis parallel to said predetermined direction to maintain a susbtantially fixed relationship between said light pattern and said observing device, thereby to obtain a magnified measure of said primary displacement.

3. A device according to claim 2, adapted for measuring a linear primary displacement, wherein said gratings are cylindrical or virtually cylindrical and have a common axis parallel to the direction of the primary displacement, the grating responsive to the primary displacement projecting into said other grating.

4. A device according to claim 2, said tracking means being responsive to said observing device for displacing said observing device relative to said gratings.

5. A device according to claim 4, said observing device comprising two photo-electrically sensitive devices disposed to observe said light pattern at positions spaced 180° in phase on the light pattern, means for comparing the electrical outputs of said latter devices, and servo-means for displacing said observing device to reduce differences in the compared outputs.

6. A device according to claim 4 said observing device comprising a photo-electrically sensitive device, means for alternately admitting light to said device from two positions on said light pattern which are spaced 180° in phase thereon, means for comparing the electrical outputs of said device in response to the alternate light inputs, and servo-means for displacing said observing device to reduce differences in the compared outputs.

References Cited in the file of this patent

UNITED STATES PATENTS

| | | |
|---|---|---|
| 1,415,627 | Giambiasi | May 9, 1922 |
| 1,794,340 | Parkhurst | Feb. 24, 1931 |
| 2,301,396 | Graf | Nov. 10, 1942 |
| 2,720,810 | Senn | Oct. 18, 1955 |